US008689616B2

(12) United States Patent
Kondo et al.

(10) Patent No.: US 8,689,616 B2
(45) Date of Patent: Apr. 8, 2014

(54) PRODUCTS HAVING A SENSOR DEVICE

(75) Inventors: Jun Kondo, Nagoya (JP); Kazufumi Serizawa, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/435,385

(22) Filed: Mar. 30, 2012

(65) Prior Publication Data

US 2012/0247195 A1 Oct. 4, 2012

(30) Foreign Application Priority Data

Apr. 1, 2011 (JP) ................................ 2011-081938

(51) Int. Cl.
*G01M 15/04* (2006.01)

(52) U.S. Cl.
USPC ........................................................ 73/114.51

(58) Field of Classification Search
USPC ........................................................ 73/114.51
See application file for complete search history.

(56) References Cited

U.S. PATENT DOCUMENTS

| | | | | |
|---|---|---|---|---|
| 6,394,977 | B1 | 5/2002 | Taylor et al. | |
| 8,100,344 | B2 | 1/2012 | Kondo et al. | |
| 2010/0252002 | A1 | 10/2010 | Fujino et al. | |
| 2012/0247194 | A1* | 10/2012 | Serizawa et al. | 73/114.51 |

FOREIGN PATENT DOCUMENTS

| | | | |
|---|---|---|---|
| JP | 2001-324402 | | 11/2001 |
| JP | 2001324402 | A * | 11/2001 |
| JP | 2002-507733 | | 3/2002 |
| JP | 2002-525500 | | 8/2002 |
| JP | 2009-275695 | | 11/2009 |
| JP | 2010-242574 | | 10/2010 |

OTHER PUBLICATIONS

Office Action (2 pgs.) dated Mar. 26, 2013 issued in corresponding Japanese Application No. 2011-081938 with an at least partial English-language translation thereof (2 pgs.).

Chinese First Office Action issued for Chinese Patent Application No. 201210090768.3, dated Dec. 4, 2013 (with partial English Translation).

Notification for Reasons for Rejection issue for Japanese Patent Application No. 2011-081938, dated Aug. 27, 2013 (with partial English translation).

* cited by examiner

*Primary Examiner* — Freddie Kirkland, III
(74) *Attorney, Agent, or Firm* — Nixon & Vanderhye P.C.

(57) ABSTRACT

A sensor device where a jig is engaged to an engaging part formed in the housing, and the housing is rotated by the jig and screwed into the member to be mounted. A position in the rotating direction of the housing is configured to have a substantially constant position at the time the screw-fixing of the housing and the member to be mounted is completed. A shape of the engaging part when seen along a direction of a rotational axis X of the housing is formed into a non-regular polygon, and the engaging part and a mold IC are shifted and disposed to a side that has a margin in a space in the housing or around the mold IC so that the space around the sensor device is used effectively.

7 Claims, 3 Drawing Sheets

PRODUCTS HAVING A SENSOR DEVICE

CROSS-REFERENCE TO RELATED APPLICATION

This application is based on and claims the benefit of priority from earlier Japanese Patent Application No. 2011-81938 filed Apr. 1, 2011, the description of which is incorporated herein by reference.

TECHNICAL FIELD

The present disclosure relates to a sensor device that outputs an electric signal according to a physical quantity.

BACKGROUND

As an injector that injects fuel into cylinders of an internal-combustion engine, the injector that integrates a sensor device therein, which detects a pressure of fuel, is proposed (refer to Japanese Patent Application Laid-Open Publication No. 2010-242574, For example).

A common sensor device 2 shown in FIGS. 4A and 4B, for example, has a housing 21 screwed to an injector body. A male screw 211 is formed on the housing 21, as well as an engaging part 213 in which a jig that rotates the housing 21 is engaged is formed in the housing 21.

Moreover, an electric circuit unit such as a mold IC 23 is disposed in the housing 21 at an end side in a direction of a rotational axis X of the housing 21.

Further, a circle A shown with a dashed line in FIG. 4B is a circumscribed circle of the engaging part 213, and the engaging part 213 has a shape of regular polygon close to a circle (dodecagon, for example) when seen along the direction of the rotational axis X of the housing 21.

Moreover, the mold IC 23 is formed into a shape as circularly as possible when seen along the direction of the rotational axis X of the housing 21, and is arranged in a projected plane of the engaging part 213.

However, if the mold IC 23 does not have the shape close to the circle but a shape close to a square, the substantially square-shaped mold IC 23 is to be disposed in the projected plane of the engaging part 213 that has the shape of regular polygon close to the circle, thus wasting space.

Thereby, a whole structure of the injector becomes large and it brings a result on which a marketability of a product is dropped.

SUMMARY

An embodiment provides a sensor device that enables a use of a space around the sensor device effectively.

In a sensor device according to a first aspect, the sensor device that outputs an electric signal according to physical quantity includes a housing screwed onto a member to be mounted, and an electric circuit unit that has an electronic component for signal processing disposed at an end of the housing.

A jig is engaged to an engaging part formed in the housing, the housing is rotated by the jig and the housing is thereby screwed into the member to be mounted, a shape of the engaging part when seen along a direction of a rotational axis of the housing is a non-regular polygon, and a position in the rotating direction of the housing is configured at substantially constant position at the time the screw-fixing of the housing and the member to be mounted is completed.

By the way, generally, in such a structure of screw-fixing the housing to the member to be mounted, a position in the rotating direction of the housing relative to the member to be mounted does not become settled in a specific position when the housing is rotated and the screw-fixing is completed.

However, by strictly managing a starting position of screw machining in the housing and the member to be mounted, for example, it becomes possible to configure the positions in the rotating direction of the housing to the member to be mounted at substantially constant position at the time of the screw-fixing being completed.

Thus, in the case where it is possible to configure the positions in the rotating direction of the housing at substantially constant position at the time of the screw-fixing being completed, the space around the sensor device is used effectively by forming the shape of the engaging part when seen along the direction of the rotational axis of the housing into the non-regular polygon, and by shifting and disposing the engaging part and the molded electric circuit to the side that has a margin in the space in the housing or around the electric circuit.

In the sensor device according to a second aspect, a shape of the engaging part when seen along the direction of the rotational axis of the housing has axial symmetry, and a number of axes of symmetry is one.

In the sensor device according to a third aspect, a shape of the engaging part when seen along the direction of the rotational axis of the housing has non-axial symmetry.

In the sensor device according to a fourth aspect, a center of the engaging part when seen along the direction of the rotational axis of the housing is shifted from the axis of rotation of the housing.

In the sensor device according to a fifth aspect, the electric circuit unit is arranged in a projected plane of the engaging part when seen along the direction of the rotational axis of the housing.

In the sensor device according to a sixth aspect, the electric circuit unit is a mold IC, and a mold resin layer thereof is chamfered along with a chamfering of the engaging part when seen along the direction of the rotational axis of the housing.

In the sensor device according to a seventh aspect, the member to be mounted is a body of an injector that injects fuel to an internal-combustion engine, and the physical quantity is a pressure of the fuel that circulates inside the body.

DETAILED DESCRIPTION OF THE PREFERRED EMBODIMENTS

With reference to the drawings, hereinafter will be described an embodiment of the present disclosure.

Figure 3:
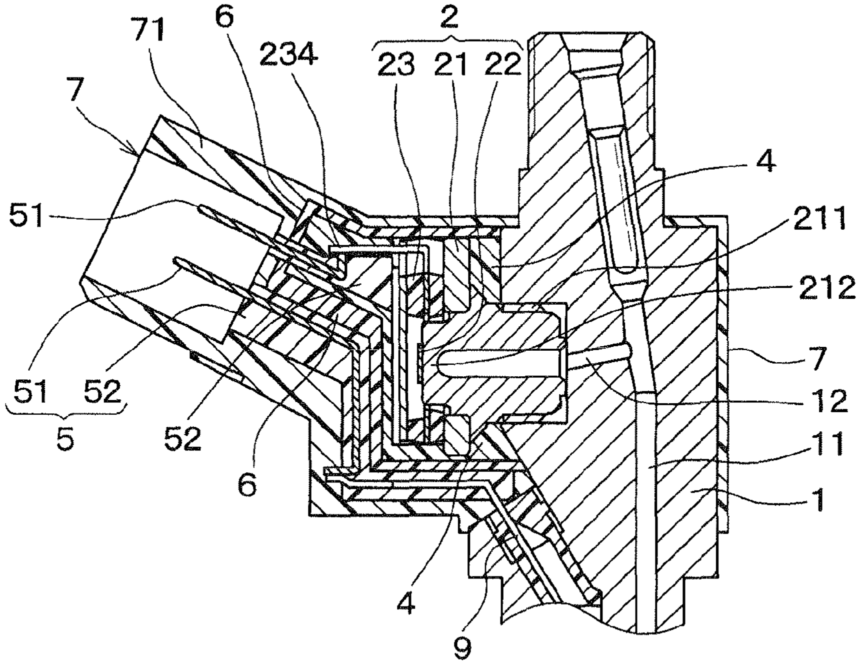
FIG. 3 shows a principal part of an injector equipped with the sensor device of FIG. 1.

As shown in FIG. 3, an injector is for injecting high-pressure fuel supplied from a common-rail (not shown) into cylinders of a diesel internal-combustion engine. A high-pressure passage 11 where high-pressure fuel circulates, and a branch passage 12 branched from the high-pressure passage 100 are formed in a metal injector body 1 which is a member to be mounted.

A sensor device 2 that detects the fuel pressure of the high-pressure passage 11 is disposed at an outer peripheral surface near an upper end of the injector body 1.

Figure 1A:
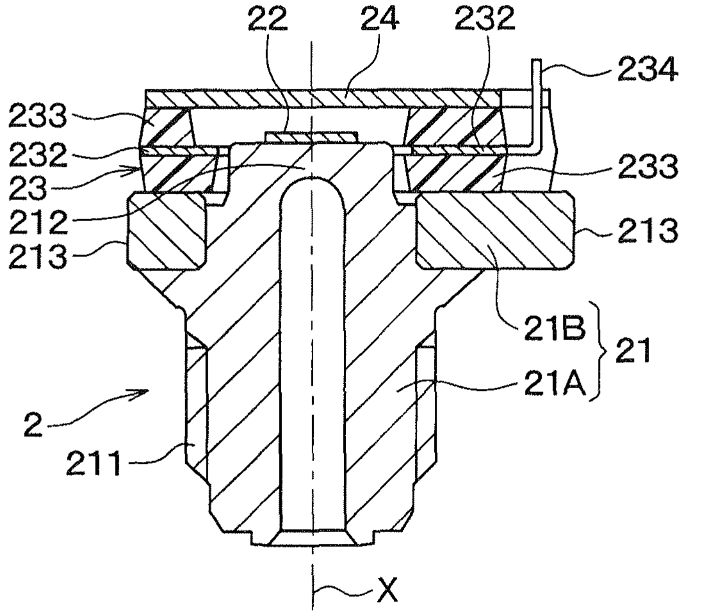
FIG. 1A shows a front sectional view of a sensor device of an embodiment of the present disclosure.

As shown in FIG. 1, a housing 21 of the sensor device 2 is unified by welding a cylindrical stem part 21A and a disk-like flange part 21B.

A male screw part 211 for screwing onto the injector body 1 and a thin-walled part 212 that changes its shape according to the pressure of the fuel led through the branch passage 12 are formed in the stem part 21A.

A sensing section 22 whose resistance value varies according to the shape change of the thin-walled part 212 (in other words, responding to the fuel pressure in the high-pressure passage 11) is stuck on the thin-walled part 212.

An engaging part 213 in which a jig 3 (refer to FIG. 2) that rotates the housing 21 is engaged is formed in the outer peripheral surface of the flange part 21B.

A mold IC 23 as an electric circuit unit is disposed at an end of the housing 21 in the direction of the rotational axis X of the housing so as to surround the thin-walled part 212 and the sensing section 22.

The mold IC 23 is attached to the flange part 21B of the housing 21 with adhesives.

The mold IC 23 has an IC 231 for signal-processing circuits as an electronic component that outputs an electrical signal according to a pressure based on the variation of the resistance value of the sensing section 22. The mold IC 23 further has a lead frame 232 that is electrically connected with the IC 231 for the signal processing circuits.

The IC 231 for the signal-processing circuits and the lead frame 232 are sealed in a mold resin layer 233 made of resin that is highly electrically insulating.

Sensor terminals 234 that are parts of the lead frame 232 are projected from a outer peripheral surface of the mold resin layer 233.

A cover 24 that covers a space where the sensing section 22 is disposed is disposed in the mold IC 23 on a side opposite to the housing 21.

The cover 24 is attached to the mold IC 23 with adhesives.

As shown in FIG. 3, a part of the housing 21, the mold IC 23 and the cover 24 are sealed by a sensor insulation component 4 made of insulating resin.

A terminal assembly 5 is disposed close to the mold IC 23. The terminal assembly 5 has a plurality of terminals 51 and a terminal insulation component 52 made of insulating resin that covers intermediate parts of the terminals 51.

Ends of a part of terminals among the plurality of terminals 51 are connected to the sensor terminal 234 of the sensor device 2, and the ends of the terminals are sealed by the sensor insulating member 4 together with the sensor terminal 234.

Ends of remaining terminals among the plurality of terminals 51 are connected to lead wires 9. In addition, other ends of the lead wires 9 are connected to a piezo stack (not shown) that forms a part of a nozzle opening-and-closing mechanism.

The sensor insulation component 4A and a part of the terminal assembly 5 are enclosed by the shield member 6 made of conductive resin. Further, the sensor device 2 is enclosed with the shield member 6 and the injector body 1.

The shield member 6 is contacted on the injector body 1, and is grounded through the injector body 1.

Moreover, the shield member 6 is surrounded by a connector case 7 made of insulating resin.

Furthermore, other ends of all the terminals 51 are exposed in a pipe part 71 of the connector case 7, and are connected with an external connector (not shown). The connector case 7 is formed separately from the shield member 6.

In addition, the sensor insulation component 4 is first formed where the sensor device 2 is screwed onto the injector body 1 and the terminal assembly 5 is set to a predetermined position. Then the shield member 6 is secondary formed, and the connector case 7 is further formed thirdly.

Figure 1B:
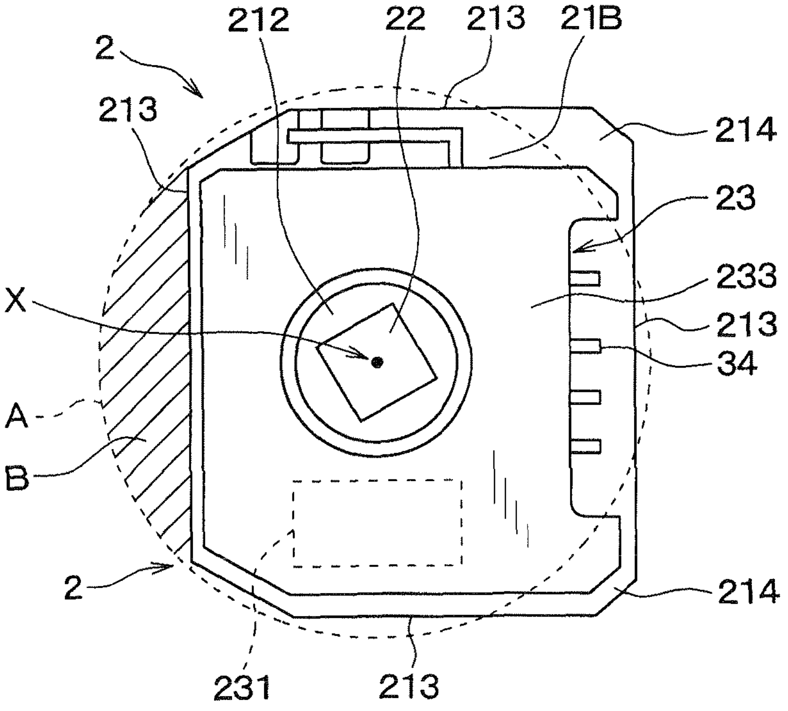
FIG. 1B shows a plan view of FIG. 1A without a cover.

As shown in FIG. 1B, a shape of the engaging part 213 when seen along the direction of the rotational axis X of the housing 21 is approximately a square or a rectangle, with chamfered corners, and is a non-regular polygon.

Moreover, a shape of the engaging part 213 when seen along the direction of the rotational axis X of the housing 21 has axial symmetry, and a number of axes of symmetry is one.

Figure 4A:
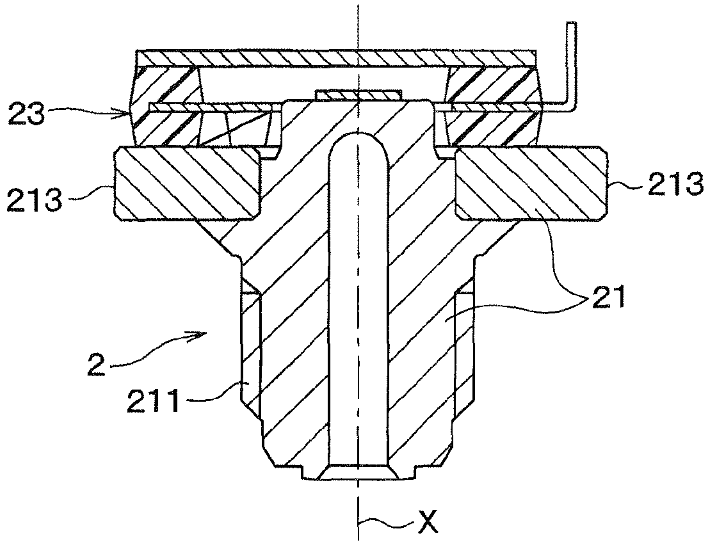
FIG.4A (PRIOR ART)
FIG. 4A shows a front sectional view of a common sensor device.
Figure 4B:
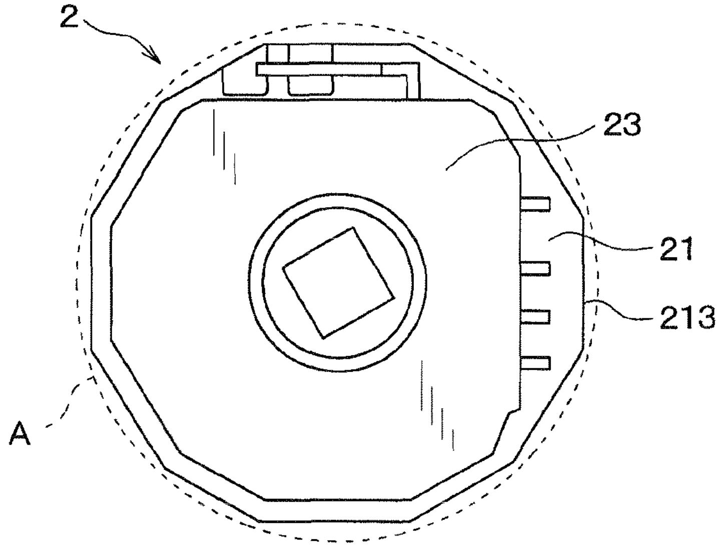
FIG.4B (PRIOR ART)
FIG. 4B shows a plan view of FIG. 4A without a cover.

Furthermore, a circle A shown with a dashed line in FIG. 1B is equivalent to a circumscribed circle of the engaging part 213 of the regular polygon in a common sensor device shown in FIG. 4.

When constructing the circle A perpendicular to the direction of the rotational axis X of the housing 21, two corners 214 located in a space right-hand side of FIG. 1B among four corners of the engaging part 213 extend outside a projected plane of the circle A.

Moreover, an area B (area shown with slashes for convenience) where the engaging part 213 does not overlap with the projected plane of the circle A is disposed in a space to the left-hand side of the engaging part 213 in FIG. 1B.

Therefore, a center of the engaging part 213 when seen along the direction of the rotational axis X of the housing 21 is shifted to the space at the right-hand side of FIG. 1B, away from the axis of rotation X of the housing 21.

A shape of the mold resin layer 233 of the mold IC 23 when seen along the direction of the rotational axis X of the housing 21 is approximately a square or a rectangle, with chamfered corners.

Further, the whole mold IC 23 including the sensor terminal 234 is disposed in the projected plane of the engaging part 213.

In addition, a shape and a size of the cover 24 when seen along the direction of the rotational axis X of the housing 21 are substantially the same with the mold resin layer 233 of mold IC 23.

Further, the cover 24 is disposed in the projected plane of the engaging part 213.

Figure 2:
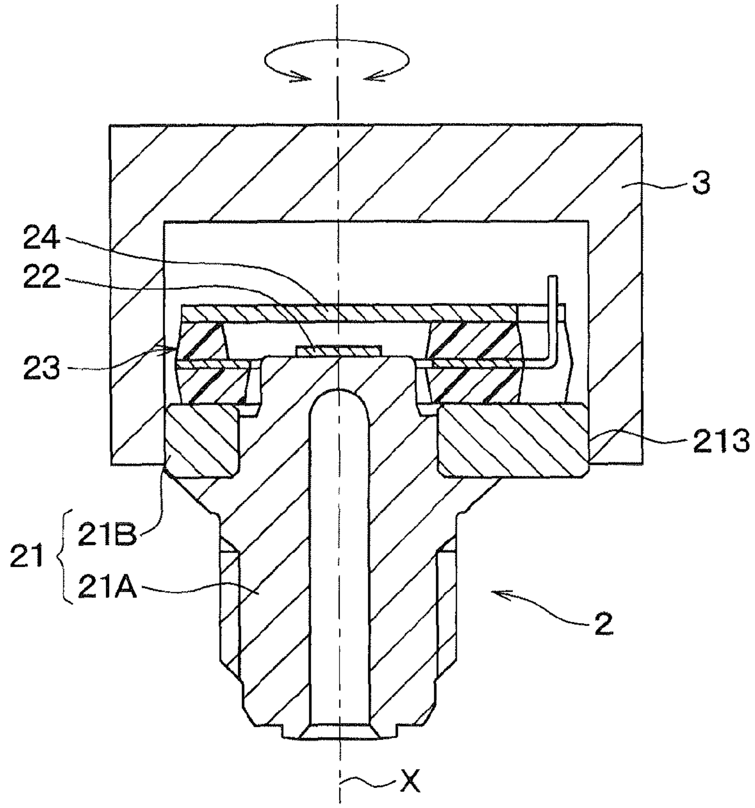
FIG. 2 shows a front sectional view of the sensor device show in FIG. 1 and an attaching jig.

As shown in FIG. 2, the sensor device 2 is rotated by the jig 3 and screwed into the injector body 1 (refer to FIG. 3).

The jig 3 has a cylindrical shape like a box wrench or a socket wrench, and engages to the engaging part 213 so as to wrap around the mold IC 23.

In the present embodiment, a starting position of screw machining in the housing 21 and the injector body 1 is strictly managed, and it is configured that the positions in the rotating direction of the housing 21 to the injector body 1 is at substantially constant position at the time of the screw-fixing being completed.

Specifically, as shown in FIG. 3, when the screw-fixing is completed, the area B (refer to FIG. 1) where the engaging part 213 does not overlap with the circle A is located in a cylinder head side (lower part space of FIG. 1) of an internal-combustion engine, and the two corners 214 (refer to FIG. 1) which extend the projected plane of the circle A in the engaging part 213 are located in a side opposite to the cylinder head (upper part space of FIG. 1) of the internal-combustion engine.

Thus, by forming the shape of the engaging part 213 when seen along the direction of the rotational axis X of the housing 21 into the non-regular polygon, and by shifting and disposing the engaging part 213 and the mold IC 23 to the side opposite to the cylinder head that has a margin in the space in the housing 21 or around the mold IC 23, the space around the sensor device 2 is used effectively.

OTHER EMBODIMENTS

Although the present disclosure is applied to the injector in the embodiment mentioned above, the present disclosure is applicable other than to the injector.

Moreover, although the sensor device that detects pressure is shown in the embodiment mentioned above, the present disclosure is applicable also to the sensor device that detects a physical quantity other than pressure.

Furthermore, although the shape of the engaging part 213 when seen along the direction of the rotational axis X of the housing 21 is formed having axial symmetry, the shape may have non-axial symmetry.

What is claimed is:

1. A product having a sensor device that outputs an electric signal according to physical quantity comprising:

a housing screwed onto a member to be mounted; and an electric circuit unit that has an electronic component for signal processing disposed at an end of the housing;

wherein, an engaging part formed in the housing is configured to receive a jig, the housing is configured to be rotated around a rotational axis of the housing by the jig and the housing is thereby configured to be screwed into the member to be mounted;

the housing is fixed to the member to be mounted at a substantially constant angular position;

a shape of the engaging part when seen along a direction of the rotational axis of the housing is a non-regular polygon; and the housing is fixed at the substantially constant angular position so that the engaging part is disposed shifted to one side of the sensor device, thereby forming a space for disposing other components of the product in another side of the sensor device.

2. The product having the sensor device according to claim 1, wherein, a shape of the engaging part when seen along the direction of the rotational axis of the housing has axial symmetry, and a number of axes of symmetry is one.

3. The product having the sensor device according to claim 1, wherein, a shape of the engaging part when seen along the direction of the rotational axis of the housing has non-axial symmetry.

4. The product having the sensor device according to claim 1, wherein, a center of the engaging part when seen along the direction of the rotational axis of the housing is shifted from the axis of rotation of the housing.

5. The product having the sensor device according to claim 1, wherein, the electric circuit unit is arranged in a projected plane of the engaging part when seen along the direction of the rotational axis of the housing.

6. The product having the sensor device according to claim 5, wherein, the electric circuit unit is a mold IC, and a mold resin layer thereof is chamfered along with a chamfering of the engaging part when seen along the direction of the rotational axis of the housing.

7. The product having the sensor device according to claim 1, wherein, the member to be mounted is a body of an injector that injects fuel to an internal-combustion engine, and the physical quantity is a pressure of the fuel that circulates inside the body.

* * * * *